US012639721B2

(12) United States Patent
Deng

(10) Patent No.: US 12,639,721 B2
(45) Date of Patent: May 26, 2026

(54) METHOD AND SYSTEM FOR IDENTIFYING AND TRACING PRODUCT, ELECTRONIC DEVICE, AND MEDIUM

(71) Applicant: Foshan Yuhe Technology Co., Ltd., Foshan (CN)

(72) Inventor: Fuquan Deng, Foshan (CN)

(73) Assignee: Foshan Yuhe Technology Co., Ltd., Foshan (CN)

( * ) Notice: Subject to any disclaimer, the term of this patent is extended or adjusted under 35 U.S.C. 154(b) by 72 days.

(21) Appl. No.: 18/664,507

(22) Filed: May 15, 2024

(65) Prior Publication Data

US 2025/0069088 A1 Feb. 27, 2025

Related U.S. Application Data

(63) Continuation of application No. PCT/CN2024/074478, filed on Jan. 29, 2024.

(30) Foreign Application Priority Data

Aug. 22, 2023 (CN) .......................... 202311062079.6

(51) Int. Cl.
*G06Q 30/018* (2023.01)
(52) U.S. Cl.
CPC .................................. *G06Q 30/018* (2013.01)
(58) Field of Classification Search
CPC ............. G06Q 30/018; G06Q 30/0185; G06K 17/0025
See application file for complete search history.

(56) References Cited

U.S. PATENT DOCUMENTS

2015/0254677 A1* 9/2015 Huxham ................. G06F 21/10
705/14.66
2023/0087846 A1* 3/2023 Cotte ................. G06Q 30/0185
340/572.1

FOREIGN PATENT DOCUMENTS

CN 103679469 A * 3/2014 .......... G06Q 10/087
CN 104915847 A 9/2015
(Continued)

OTHER PUBLICATIONS

Supplementary European Search Report received in corresponding European patent application No. 24723450.3, dated Nov. 25, 2024, 5 pages.

(Continued)

*Primary Examiner* — Jessica Lemieux
*Assistant Examiner* — Emily M. Kraisinger
(74) *Attorney, Agent, or Firm* — Cooper Legal Group, LLC

(57) ABSTRACT

The present application relates to a method and system for identifying and tracing a product, an electronic device, and a storage medium. The method includes: acquiring, by a testing end, source code information of a to-be-tested end, and identifying a unique identification code according to a preset identification rule, the to-be-tested end being located on an openable part of the product; sending the unique identification code to a cloud by the testing end, and identifying the unique identification code by the cloud according to a preset comparison rule; when it is identified by the cloud that the product is a certified product, changing the unique identification code according to a preset change rule to generate a certified product result data packet, and sending the certified product result data packet to the testing end; and receiving and displaying the certified product result data packet by the testing end.

5 Claims, 7 Drawing Sheets

(56)     References Cited

FOREIGN PATENT DOCUMENTS

| | | | | | |
|---|---|---|---|---|---|
| CN | 105528709 | A | 4/2016 | | |
| CN | 108334915 | A | 7/2018 | | |
| CN | 110232574 | A | 9/2019 | | |
| CN | 111768210 | A | 10/2020 | | |
| CN | 115953175 | A | 4/2023 | | |
| CN | 116495348 | A | 7/2023 | | |
| CN | 117057823 | A | 11/2023 | | |
| IT | UB20153358 | A1 | 3/2017 | | |
| JP | 5505619 | B2 * | 5/2014 | | |
| WO | WO-2015039279 | A1 * | 3/2015 | ............. | G06F 21/33 |
| WO | WO-2016035012 | A1 * | 3/2016 | ........... | G06Q 30/018 |

OTHER PUBLICATIONS

First Office Action cited in corresponding Chinese patent Application No. 202311062079.6, dated Jan. 11, 2024, 16 pages.

* cited by examiner

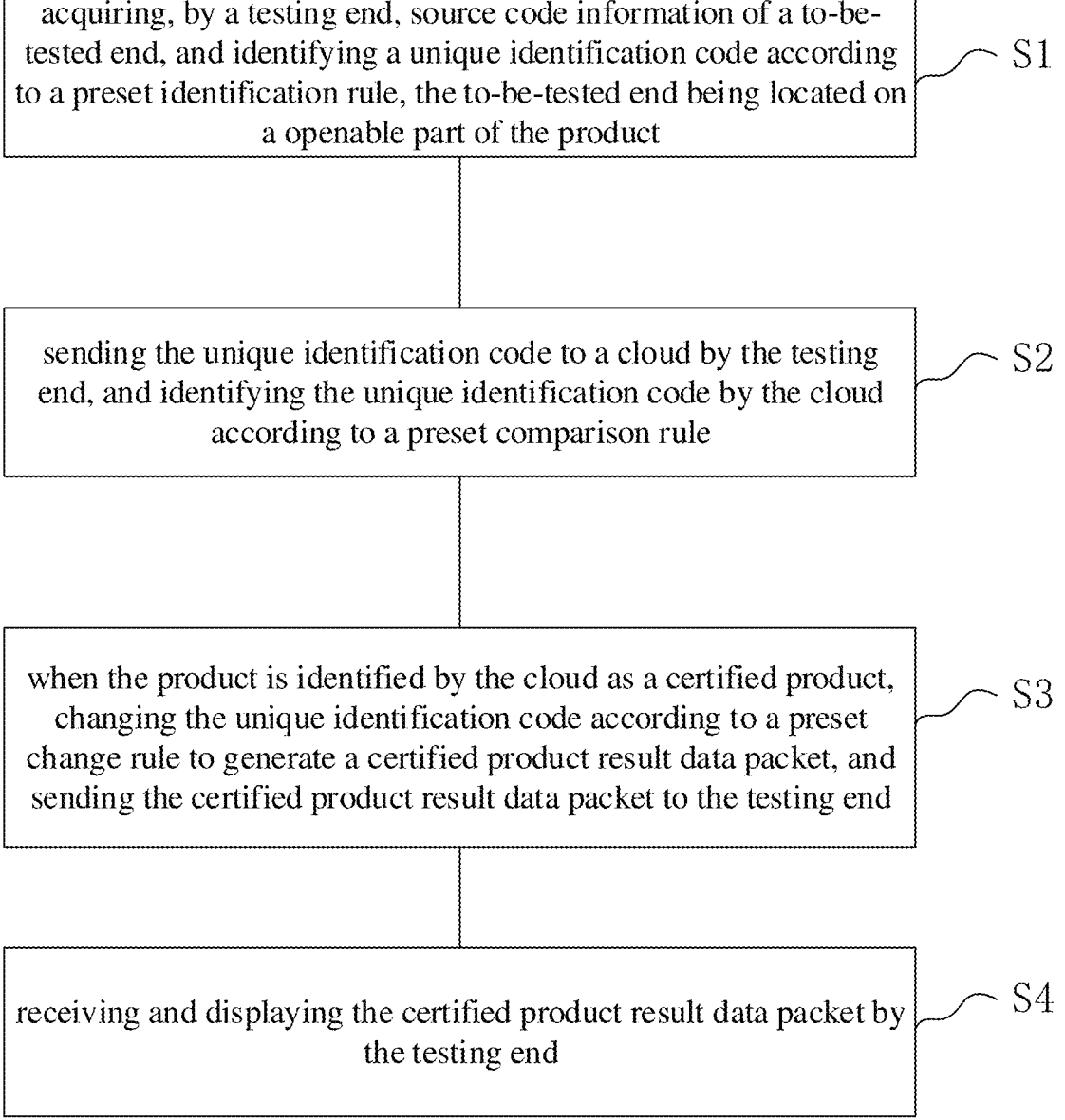

acquiring, by a testing end, source code information of a to-be-tested end, and identifying a unique identification code according to a preset identification rule, the to-be-tested end being located on a openable part of the product ⟶ S1 sending the unique identification code to a cloud by the testing end, and identifying the unique identification code by the cloud according to a preset comparison rule ⟶ S2 when the product is identified by the cloud as a certified product, changing the unique identification code according to a preset change rule to generate a certified product result data packet, and sending the certified product result data packet to the testing end ⟶ S3 receiving and displaying the certified product result data packet by the testing end ⟶ S4

FIG. 1

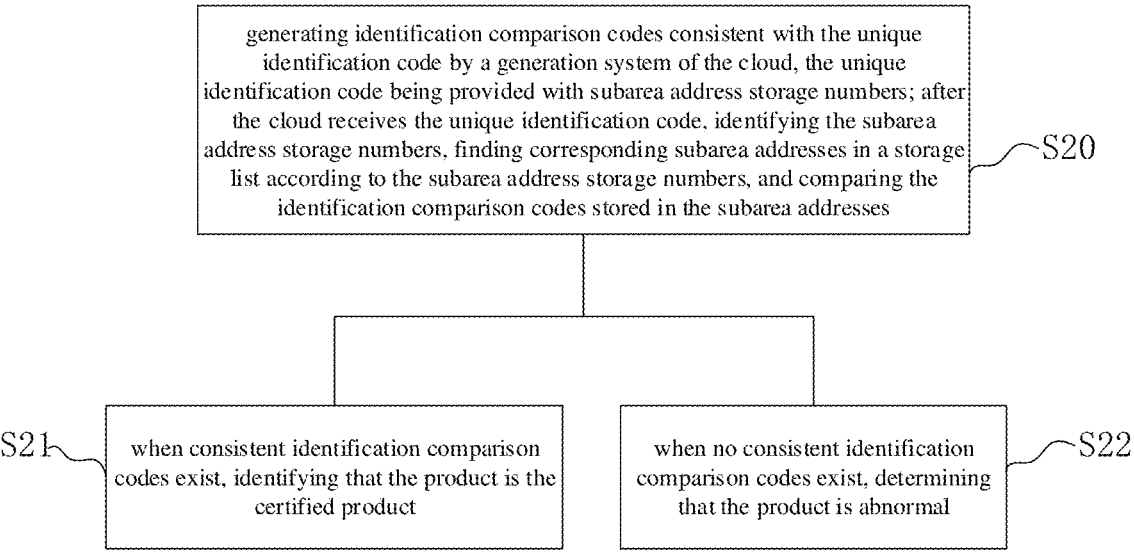

generating identification comparison codes consistent with the unique identification code by a generation system of the cloud, the unique identification code being provided with subarea address storage numbers; after the cloud receives the unique identification code, identifying the subarea address storage numbers, finding corresponding subarea addresses in a storage list according to the subarea address storage numbers, and comparing the identification comparison codes stored in the subarea addresses ⟋S20

S21 — when consistent identification comparison codes exist, identifying that the product is the certified product when no consistent identification comparison codes exist, determining that the product is abnormal ⟋S22

FIG. 2

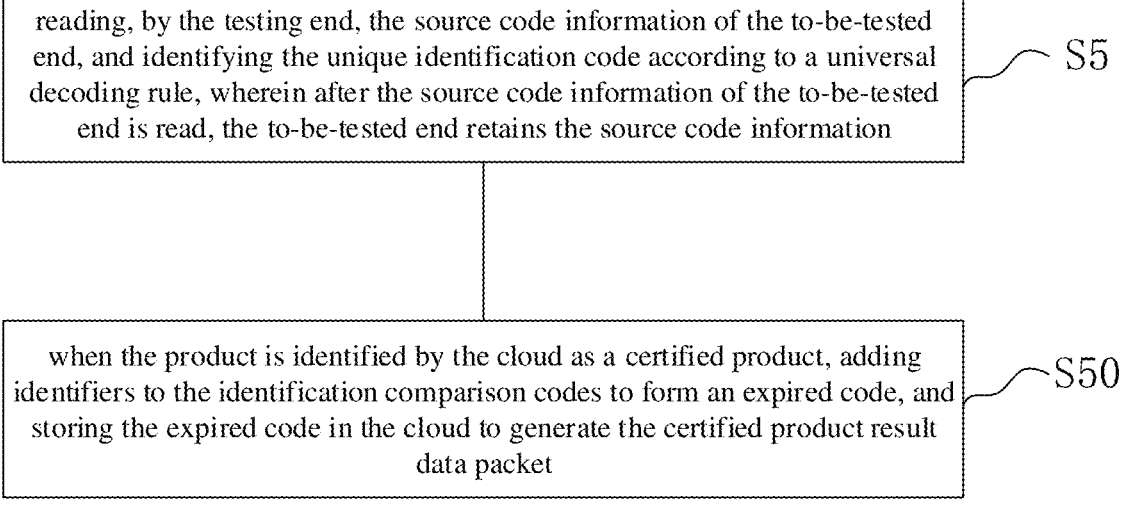

reading, by the testing end, the source code information of the to-be-tested end, and identifying the unique identification code according to a universal decoding rule, wherein after the source code information of the to-be-tested end is read, the to-be-tested end retains the source code information ⟋ S5 when the product is identified by the cloud as a certified product, adding identifiers to the identification comparison codes to form an expired code, and storing the expired code in the cloud to generate the certified product result data packet ⟋S50

FIG. 3 extracting, by the testing end, the source code information of the to-be-tested end, and identifying the unique identification code according to a specific decoding rule, wherein after the source code information of the to-be-tested end is successfully decoded, the to-be-tested end deletes the source code information ⟋⁓ S6 when the product is identified by the cloud as a certified product, deleting the identification comparison codes and the unique identification code ⟋⁓S60

FIG. 4

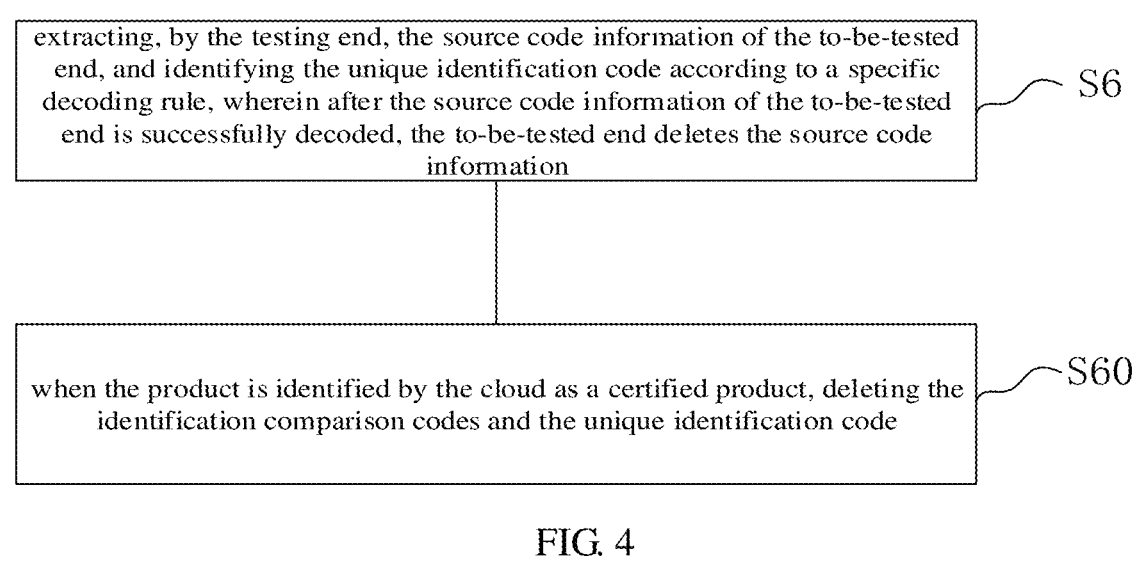

METHOD AND SYSTEM FOR IDENTIFYING AND TRACING PRODUCT, ELECTRONIC DEVICE, AND MEDIUM

CROSS-REFERENCE TO RELATED APPLICATIONS

This application is a continuation of PCT application serial no. PCT/CN2024/074478, filed on Jan. 29, 2024, which claims the priority and benefit of Chinese patent application serial no. 202311062079.6, filed on Aug. 22, 2023. The entireties of PCT application serial no. PCT/CN2024/074478 and Chinese patent application serial no. 202311062079.6 are hereby incorporated by reference herein and made a part of this specification.

TECHNICAL FIELD

The present application relates to the technical field of anti-counterfeiting, in particular to a method and system for identifying and tracing a product, an electronic device, and a storage medium.

BACKGROUND ART

At present, in the market, for high-value disposable consumer goods, counterfeit products emerge in endlessly.

For existing anti-counterfeiting means, in addition to improvement on the counterfeiting difficulty due to the formation of a packaging logo by using a special production process, inspection information such as a two-dimensional code is generally disposed inside a bottle cap or other opening parts of a product, the two-dimensional code is generated after a manufacturer uploads production information to a server, a user acquires the product information by scanning the two-dimensional code so as to identify the authenticity.

However, there are still the following problems in above ways: the bottle cap or opening parts on which the inspection information is disposed can be recycled for the second time or repeatedly and used on a counterfeit product, so that the information obtained by consumers is real information, but the product is actually counterfeit, which urgently needs to be solved.

SUMMARY

Objects of the present application are to provide a method and system for identifying and tracing a product, an electronic device, and a storage medium, which have the characteristics of reducing the situation that a bottle cap or opening part on which inspection information is disposed is recycled repeatedly on a counterfeit product, and improving the safety of the product.

In a first aspect, the present application provides a method for identifying and tracing a product, including:

acquiring, by a testing end, source code information of a to-be-tested end, and identifying a unique identification code according to a preset identification rule, the to-be-tested end being located on an openable part of the product;

sending the unique identification code to a cloud by the testing end, and identifying the unique identification code by the cloud according to a preset comparison rule;

when it is identified by the cloud that the product is a certified product, changing the unique identification code according to a preset change rule to generate a certified product result data packet, and sending the certified product result data packet to the testing end; and receiving and displaying the certified product result data packet by the testing end.

By adopting the above-mentioned technical solution, the disposed to-be-tested end is located on the openable part of the product, and the to-be-tested end can also be destroyed after the product is opened, so that the probability that the to-be-tested end is reused is reduced. The testing end tests the to-be-tested end, identifies the unique identification code, and sends the unique identification code to the cloud for comparison, and when it is identified by the cloud that the product is the certified product, the unique identification code is changed, so that the unique identification code cannot be reused, then, the probability that the product is tested to be the certified product when the to-be-tested end is reused is reduced, the situation that the to-be-tested end is repeatedly recycled and applied to a counterfeited product to realize anti-counterfeiting is reduced, and the safety of the product is improved. The cloud is used to identify the product, which can effectively reduce the internal memory of the testing end, and can also reduce the production cost of the testing end.

Optionally, the step of identifying the unique identification code by the cloud according to a preset comparison rule includes:

generating identification comparison codes consistent with the unique identification code by a generation system of the cloud, the unique identification code being provided with subarea address storage numbers; after the cloud receives the unique identification code, identifying the subarea address storage numbers, finding corresponding subarea addresses in a storage list according to the subarea address storage numbers, and comparing the identification comparison codes stored in the subarea addresses;

when consistent identification comparison codes exist, identifying that the product is the certified product; and when no consistent identification comparison codes exist, determining that the product is abnormal.

By adopting the above-mentioned technical solution, the disposed subarea address storage numbers can reduce the traversal quantity for data processing performed by the cloud, and increase the testing rate. At the same time, after the cloud completes the identification for data in the storage list of the current subarea addresses, deletion for the data in the storage list can be triggered, and subarea address numbers are only retained, so that the generation system is prevented from generating a repeated unique identification code later, at the same time, the storage space of the cloud can also be released, and the data processing rate of the cloud can be increased.

Optionally, if the step of acquiring, by a testing end, source code information of a to-be-tested end is a step of reading source code information of a to-be-tested end, the step of identifying a unique identification code by a testing end according to a preset identification rule includes:

reading, by the testing end, the source code information of the to-be-tested end, and identifying the unique identification code according to a universal decoding rule, wherein after the source code information of the to-be-tested end is read, the to-be-tested end retains the source code information; and the step of identifying the unique identification code by the cloud according to a preset comparison rule includes:

when it is identified by the cloud that the product is the certified product, adding identifiers to the identification comparison codes to form expired codes, and storing the expired codes in the cloud.

By adopting the above-mentioned technical solution, when a user tests the to-be-tested end for the second time, the identifiers have been added to the identification comparison codes to form the expired codes, which proves that the to-be-tested end has been used. No matter how to check, no matchable identification comparison codes can be found. By such setting, the uniqueness and disposability of the unique identification code are effectively ensured, and the possibility that the to-be-tested end is used for the second time is reduced.

Optionally, if the step of acquiring, by a testing end, source code information of a to-be-tested end is a step of extracting source code information of a to-be-tested end, the step of identifying a unique identification code by a testing end according to a preset identification rule includes:

extracting, by the testing end, the source code information of the to-be-tested end, and identifying the unique identification code according to a specific decoding rule, wherein after the source code information of the to-be-tested end is successfully decoded, the to-be-tested end deletes the source code information; and the step of identifying the unique identification code by the cloud according to a preset comparison rule includes:

when it is identified by the cloud that the product is the certified product, deleting the identification comparison codes and the unique identification code.

By adopting the above-mentioned technical solution, a certified product result cannot be obtained any more when the testing end tests the to-be-tested end for the second time, and there is no such data in a database of the cloud. By such setting, the uniqueness and disposability of the unique identification code are effectively ensured, the possibility that the to-be-tested end is used for the second time is reduced, and the internal memory of the cloud can also be released in time.

Optionally, after the openable part of the product is opened in a preset opening way, a destruction rate of the source code information reaches a preset range, and the source code information is changed to secondary source code information; and the method for identifying and tracing the product further includes:

acquiring, by the testing end, the secondary source code information, and correspondingly identifying a standby identification code;

sending the standby identification code to the cloud by the testing end, and parsing the standby identification code by the cloud to obtain a secondary unique identification code and a unique identification code storage address;

obtaining the unique identification code by the cloud according to the unique identification code storage address, and comparing the secondary unique identification code with the unique identification code to determine whether the secondary unique identification code is consistent with the unique identification code;

if the secondary unique identification code is consistent with the unique identification code, generating the certified product result data packet; and if the secondary unique identification code is inconsistent with the unique identification code, generating an abnormal state result data packet.

By adopting the above-mentioned technical solution, if a purchasing user forgets to test the product before the opening the product, the authenticity of the product can be tested for the second time, so that the applicability of the present application is improved.

Optionally, after the step that the openable part of the product is opened in a preset opening way, and a destruction rate of the source code information reaches a preset range, the method further includes:

after the to-be-tested end is destroyed, triggering a timer in the to-be-tested end for timing, and when the testing end tests the to-be-tested end, triggering the to-be-tested end to send a timing duration to the testing end;

when the testing end receives the standby identification code and the timing duration, sending the timing duration and the standby identification code to the cloud by the testing end; and when the cloud parses the standby identification code and determines that the secondary unique identification code is inconsistent with the unique identification code, determining opening time according to the timing duration and the current time, and sending the opening time and the abnormal state result data packet to the testing end.

By adopting the above-mentioned technical solution, after the disposed to-be-tested end is destroyed, the timer in the to-be-tested end can be triggered for timing, the cloud determines the opening time according to the timing duration and the current time, so that the user can check whether the first opening time is correct, and then determine the authenticity of the product. By such setting, the situation that the product correctly opened in the preset opening way is recycled and counterfeited by law-breakers can also be effectively prevented.

Optionally, the method further includes:

when the testing end receives the standby identification code, but does not receive the timing duration, and the testing end determines that the timing duration is a preset duration, sending the preset duration and the standby identification code to the cloud.

By adopting the above-mentioned technical solution, the energy consumption of the timer also means that the opening time has exceeded the preset duration, and thus, it can be directly determined that the opening time exceeds the preset duration. By such setting, the counterfeiting difficulty is further increased, and the anti-counterfeiting strength is improved.

In a second aspect, the present application provides a system for identifying and tracing a product, including a testing end and a cloud;

the testing end including an acquisition module and a display module; and the cloud including an identification module and a change module;

wherein the acquisition module is configured to acquire, by the testing end, source code information of a to-be-tested end, and identify a unique identification code according to a preset identification rule, the to-be-tested end being located on an openable part of the product;

the identification module is configured to send the unique identification code to the cloud by the testing end, and identify the unique identification code by the cloud according to a preset comparison rule;

the change module is configured to, when it is identified by the cloud that the product is a certified product, change the unique identification code according to a preset change rule to generate a certified product result data packet, and send the certified product result data packet to the testing end; and the display module is configured to receive and display the certified product result data packet by the testing end.

In a third aspect, the present application provides an electronic device, including a memory, a processor, a computer program stored in the memory and capable running on the processor which, when executing the computer program, implements the steps of the above-mentioned method for identifying and tracing the product.

In a fourth aspect, the present application provides a nonvolatile computer storage medium, having stored thereon a computer program which, when executed by a processor, implements the steps of the above-mentioned method for identifying and tracing the product.

In conclusion, the present application has the beneficial technical effects:

the disposed to-be-tested end is located on the openable part of the product, and the to-be-tested end can also be destroyed after the product is opened, so that the probability that the to-be-tested end is reused is reduced. The testing end tests the to-be-tested end, identifies the unique identification code, and sends the unique identification code to the cloud for comparison, and when it is identified by the cloud that the product is the certified product, the unique identification code is changed, so that the unique identification code cannot be reused, then, the probability that the product is tested to be the certified product when the to-be-tested end is reused is reduced, the situation that the to-be-tested end is repeatedly recycled and applied to a counterfeited product to realize anti-counterfeiting is reduced, and the safety of the product is improved.

BRIEF DESCRIPTION OF THE DRAWINGS

FIG. 1 is a schematic flow diagram of a method for identifying and tracing a product according to one of embodiments of the present application;

FIG. 2 is a schematic flow diagram of specific steps of step S2 according to another embodiment of the present application;

FIG. 3 is a schematic flow diagram of a step that a testing end reads source code information according to another embodiment of the present application;

FIG. 4 is a schematic flow diagram of a step that a testing end extracts source code information according to another embodiment of the present application;

6

Figure 5:
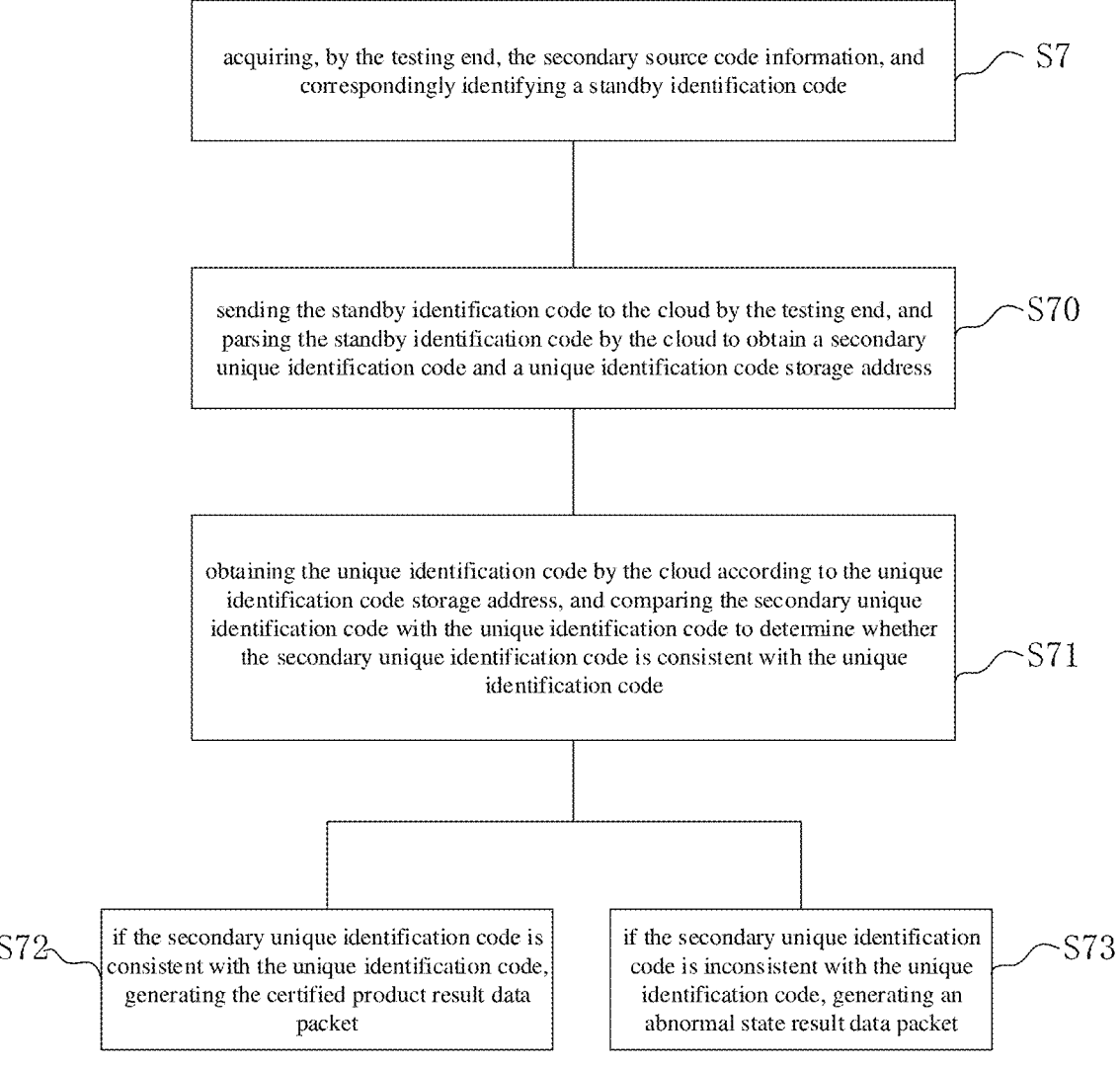
FIG. 5 is a schematic flow diagram of a step performed after source code information is changed to secondary source code information according to another embodiment of the present application.

In which, 1, acquisition module; 2, identification module; 3, change module; and 4, display module.

DETAILED DESCRIPTION

The present application will be further described in detail below in conjunction with the accompanying drawings 1 to 8.

In order to make the objects, technical solutions and advantages of the present application clearer and more understandable, the present application will be further described in detail below in conjunction with the accompanying drawings 1 to 8 and embodiments. It should be understood that the specific embodiments described herein are only intended to explain the present application, rather than to limit the present application.

An embodiment of the present application provides a method for identifying and tracing a product, which is applied to the industry of high-value disposable consumer goods, such as top-grade wines.

With reference to FIG. 1, a method for identifying and tracing a product according to an embodiment of the present application includes:

S1, a testing end acquires source code information of a to-be-tested end, and identifies a unique identification code according to a preset identification rule, the to-be-tested end being located on an openable part of the product.

In an embodiment, the testing end may be a testing instrument disposed on a supporting product side of a manufacturer, and thus, the preset identification rule used by the testing instrument is a specific decoding rule. In another embodiment, the testing end may also be a common communication device such as a mobile phone, the preset identification rule used by the communication device is a universal decoding rule, such as scanning codes for identification, and may also be a specific decoding rule, and the mobile phone can use the specific decoding rule by downloading relevant programs developed by the manufacturer. An identification code between the testing end and the to-be-tested end is in various forms at least including numbers, symbols, letters, pictures, wavebands, etc.

The disposed to-be-tested end is located on the openable part of the product, and the to-be-tested end can also be destroyed after the product is opened, so that the probability that the to-be-tested end is reused is reduced, and then, the authenticity of an actual product is ensured. Specifically, in an embodiment, the disposed to-be-tested end is located in a bottle cap. Specifically, the to-be-tested end is of a chip structure with a recording function, a chip is of a hollow square, one end of the chip is connected to the bottle cap, the other end thereof is connected to a bottle body, the chip can be destroyed when the bottle cap is opened, and then, the probability that the to-be-tested end is used for the second time is reduced. Further, a tearing line is preset on the chip, and the preset tearing line can effectively control a destruction rate of the chip torn up after the bottle cap is opened by a user in a way preset by the manufacturer.

S2, the testing end sends the unique identification code to a cloud, and the cloud identifies the unique identification code according to a preset comparison rule.

After identifying the unique identification code according to the preset identification rule, the testing end sends the unique identification code to the cloud, and the cloud identifies the unique identification code, which is beneficial to the reduction of an internal memory of the testing end, and can also reduce the production cost of the testing end.

Further, FIG. 2 is a flow diagram of an optional implementation of the preset comparison rule in step S2 in the present application. With reference to FIG. 2, step S2 specifically includes the following steps:

S20, a generation system of the cloud generates identification comparison codes consistent with the unique identification code, the unique identification code being provided with subarea address storage numbers; after receiving the unique identification code, the cloud identifies the subarea address storage numbers, finds corresponding subarea addresses in a storage list according to the subarea address storage numbers, and compares the identification comparison codes stored in the subarea addresses;

S21, when consistent identification comparison codes exist, it is identified that the product is the certified product; and S22, when no consistent identification comparison codes exist, it is determined that the product is abnormal.

The source code information stored by the chip inside the to-be-tested end is also generated by the generation system of the cloud, the parsed source code information is the unique identification code which is consistent with the identification comparison codes. Specifically, the unique identification code and the identification comparison codes include prefix parts and suffix parts, the prefix parts are divided into the subarea address storage numbers, the cloud is provided with the storage list with a limited storage number according to the subarea addresses, the subarea address storage numbers correspond to the corresponding subarea addresses, and after the cloud completes the identification for data in the storage list of the current subarea addresses one by one, deletion for the data in the storage list can be triggered, and subarea address numbers are only retained, so that the generation system is prevented from generating a repeated unique identification code later, at the same time, the storage space of the cloud can also be released, and the data processing rate of the cloud can be increased.

S3, when it is identified by the cloud that the product is the certified product, the unique identification code is changed according to a preset change rule to generate a certified product result data packet, and the certified product result data packet is sent to the testing end.

After the unique identification code is changed, it means that the unique identification code has been used, and no certified product results will appear after secondary use, so that the situation that the to-be-tested end is recycled for the second time or repeatedly and is used on a counterfeit product is reduced. In the present embodiment, the set certified product result data packet can further reflect other product contents in addition to the display of certified product results. Specifically, the product contents include information on a factory site, delivery time, sealing time, whether it exceeds the shelf life, etc. The product contents relate to a scene where the product itself is actually applied; if the product is food, determination whether it is a certified product, shelf life, etc. will be emphasized; if the product is a supply, the time of entering and leaving a factory, etc. will be emphasized.

S4, the testing end receives and displays the certified product result data packet.

The testing end is provided with a display screen to display content information included by the certified product result data packet.

Further, with reference to FIG. 3, in an embodiment, if the step that a testing end acquires source code information of a to-be-tested end is a step that source code information of a to-be-tested end is read, an identification process of the preset identification rule and a change process of the preset change rule specifically include the following steps:

S5, the testing end reads the source code information of the to-be-tested end, and identifies the unique identification code according to a universal decoding rule, wherein after the source code information of the to-be-tested end is read, the to-be-tested end retains the source code information.

S50, when it is identified by the cloud that the product is the certified product, identifiers are added to the identification comparison codes to form expired codes, and the expired codes are stored in the cloud to generate the certified product result data packet.

Specifically, the reading way is that the to-be-tested end will retain the source code information, and therefore, the testing end can only identify the unique identification code according to the universal decoding rule, which can effectively reduce the research and development costs. When a user tests the to-be-tested end for the second time, the identifiers have been added to the identification comparison codes to form the expired codes, which proves that the to-be-tested end has been used. No matter how to check, no matchable identification comparison codes can be found. By such setting, the uniqueness and disposability of the unique identification code are effectively ensured, and the possibility that the to-be-tested end is used for the second time is reduced.

Further, with reference to FIG. 4, in another embodiments, if the step that a testing end acquires source code information of a to-be-tested end is a step that source code information of a to-be-tested end is extracted, an identification process of the preset identification rule and a change process of the preset change rule specifically include the following steps:

S6, the testing end extracts the source code information of the to-be-tested end, and identifies the unique identification code according to a specific decoding rule, wherein after the source code information of the to-be-tested end is successfully decoded, the to-be-tested end deletes the source code information.

S60, when it is identified by the cloud that the product is the certified product, the identification comparison codes and the unique identification code are deleted.

Specifically, the extraction way is that the to-be-tested end actively deletes the source code information. In the present embodiment, the disposed testing end can identify the unique identification code according to the specific decoding rule, and then trigger the to-be-tested end to delete the source code information. Further, after the testing end sends the unique identification code to the cloud, the unique identification code is matched with the identification comparison codes by the cloud; if corresponding matching information is not found, it is identified that the product is abnormal, a result that the product is abnormal is returned; if the corresponding matching formation is found, it is identified that the product is the certified product, and then, the identification comparison codes and the unique identification code will be deleted. By such setting, a certified product result cannot be obtained any more when the testing end tests the to-be-tested end for the second time, and there is no such data in a database of the cloud. By such setting, the uniqueness and disposability of the unique identification code are effectively ensured, the possibility that the to-be-tested end is used for the second time is reduced, and the internal memory of the cloud can also be released in time.

It should be noted that subarea address numbers are only retained after the cloud deletes the identification comparison codes and the unique identification code, thereby preventing the generation system from generating the same identification comparison codes and unique identification code again.

Further, the present application further includes the following setting: after the openable part of the product is opened in a present opening way, a destruction rate of the source code information reaches a preset range, and the source code information is changed to secondary source code information. Specifically, in an embodiment, the to-be-tested end is of a chip structure with a recording function, a tearing line or folding line is preset on a chip, the preset tearing line or folding line can effectively control the destruction rate of the chip torn up after the user opens the bottle cap, and after the destruction rate reaches a certain preset range, the source code information is changed to the secondary source code information. In the present embodiment, the preset range of the destruction rate is set within 80% to 85%; if the destruction rate reaches the destruction rate range, the secondary source code information can be tested; and if the destruction rate is smaller than or greater than the destruction rate range, the secondary source code information cannot be tested. By such setting, the preset opening way can also be used as an anti-counterfeiting link, the counterfeiting difficulty is increased, and when some outlaws open the production opening part in a non-preset opening way, the destruction rate of the chip will be lower than or higher than the destruction rate range, and then, the testing end cannot realize identification.

Further, with reference to FIG. 5, when the destruction rate of the source code information reaches the preset range, the source code information is changed to the secondary source code information, identification processes of the testing end and the cloud include:

S7, the testing end acquires the secondary source code information, and correspondingly identifies a standby identification code;

S70, the testing end sends the standby identification code to the cloud, and the cloud parses the standby identification code to obtain a secondary unique identification code and a unique identification code storage address;

S71, the cloud obtains the unique identification code according to the unique identification code storage address, and compares the secondary unique identification code with the unique identification code to determine whether the secondary unique identification code is consistent with the unique identification code;

S72, if the secondary unique identification code is consistent with the unique identification code, the certified product result data packet is generated; and S73, if the secondary unique identification code is inconsistent with the unique identification code, an abnormal state result data packet is generated.

Specifically, by above setting, if a purchasing user forgets to test the product before the opening the product, the authenticity of the product can be tested for the second time, so that the applicability of the present application is improved. If the to-be-tested end is destroyed because the purchasing user forgets to test the product before opening the product, after the product is opened in the preset opening way, the testing end can still identify the standby identification code, the secondary unique identification code and the unique identification code storage address can be identified for the second time by parsing the standby identification code by the cloud, and then, the secondary unique identification code can be compared with the unique identification code to determine whether the secondary unique identification code is consistent with the unique identification code; wherein if the secondary unique identification code is consistent with the unique identification code, it is proven that the unique identification code is not changed, and the certified product result data packet is generated and fed back to the testing end; and if the secondary unique identification code is inconsistent with the unique identification code, it is proven that the unique identification code is changed, and the abnormal state result data packet is generated and fed back to the testing end, wherein the abnormal state result data packet is configured to remind the user that the product may be counterfeited.

Figure 6:
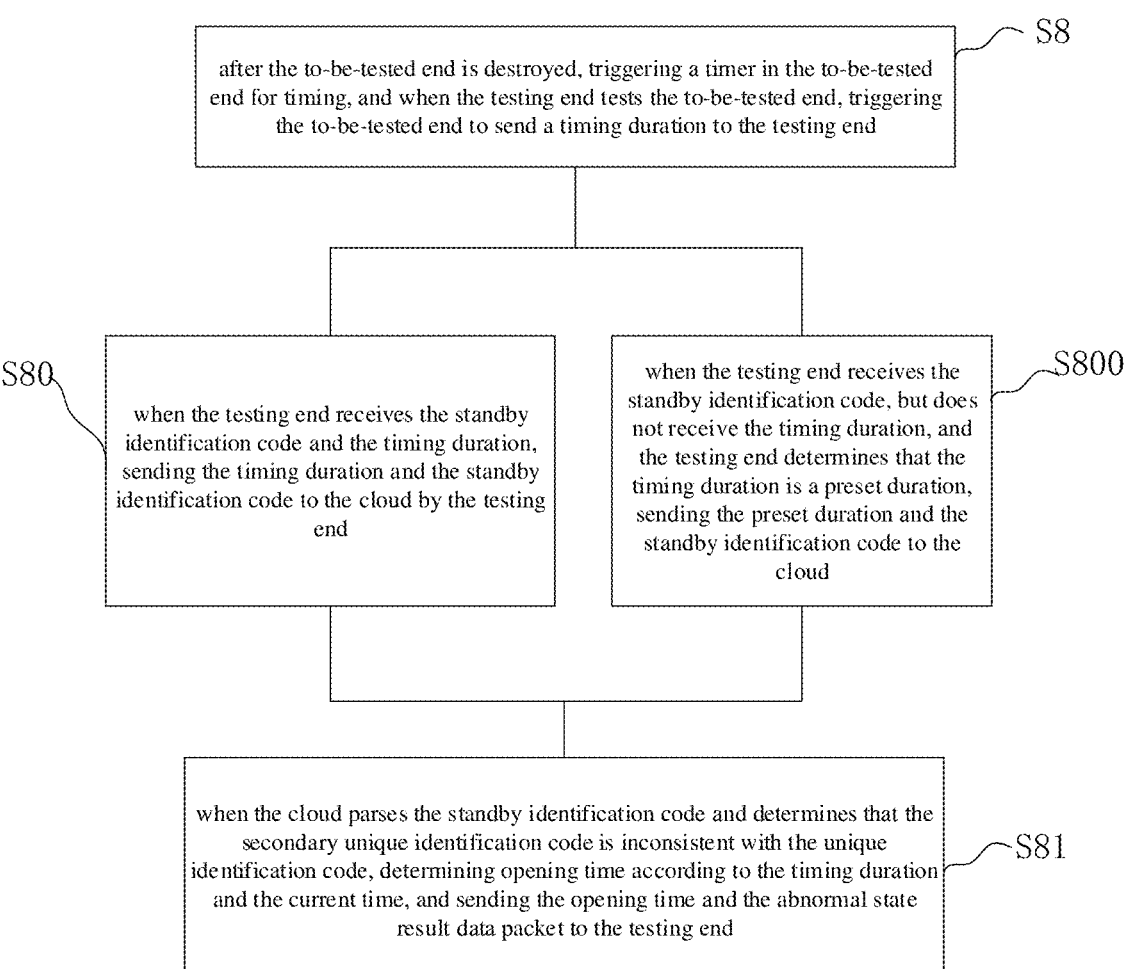
FIG. 6 is a schematic flow diagram of a step performed after a destruction rate of the source code information reaches a preset range according to another embodiment of the present application.

Further, with reference to FIG. 6, after the step that the openable part of the product is opened in a present opening way, and a destruction rate of the source code information reaches a preset range, steps S8, S80 and S81 are further increased:

S8, after the to-be-tested end is destroyed, a timer in the to-be-tested end is triggered for timing, and when the testing end tests the to-be-tested end, the to-be-tested end is triggered to send a timing duration to the testing end;

S80, when the testing end receives the standby identification code and the timing duration, the testing end sends the timing duration and the standby identification code to the cloud; and S81, when the cloud parses the standby identification code and determines that the secondary unique identification code is inconsistent with the unique identification code, opening time is determined according to the timing duration and the current time, and the opening time and the abnormal state result data packet are sent to the testing end.

As above, after the disposed to-be-tested end is destroyed, that is, after the chip structure of the openable part of the product is destroyed to the preset range in the preset opening way, the timer in the to-be-tested end can be triggered for timing, and when the testing end tests the to-be-tested end, the to-be-tested end can be triggered to send the timing duration to the testing end, the testing end sends the timing duration and the standby identification code to the cloud at the same time, when the cloud parses the standby identification code and determines that the secondary unique identification code is inconsistent with the unique identification code, it is identified that the product is abnormal, at the moment, the cloud determines the opening time according to the timing duration and the current time, and sends the opening time and the abnormal state result data packet to the testing end, so that the user checks whether the first opening time is correct, and then determines the authenticity of the product. By such setting, the situation that the product correctly opened in the preset opening way is recycled and counterfeited by law-breakers can also be effectively prevented.

Further, with reference to FIG. 6, when the testing end tests the to-be-tested end, the method further includes the following step:

S800, when the testing end receives the standby identification code, but does not receive the timing duration, and the testing end determines that the timing duration is a preset duration, the preset duration and the standby identification code are sent to the cloud.

Specifically, since energy consumption is caused in the timer, the energy is completely consumed due to an overlong timing duration after the timer is triggered. Therefore, when the testing end tests the to-be-tested end, the testing end receives the standby identification code, but does not receive the timing duration, it is proven that the timing duration exceeds the preset duration, the testing end determines that the timing duration is the preset duration, the preset duration and the standby identification code are sent to the cloud, and the cloud determines the opening time according to the preset duration and the current time, with a general format being "opening before it exceeds N days". By such setting, the counterfeiting difficulty is further increased, and the anti-counterfeiting strength is improved.

It should be understood that a serial number of each step in the above-mentioned embodiment does not mean a performing order. The performing order of each process should be determined according to its function and internal logic, but should not constitute any limitations on the implementation process of the embodiment of the present application.

Figure 7:
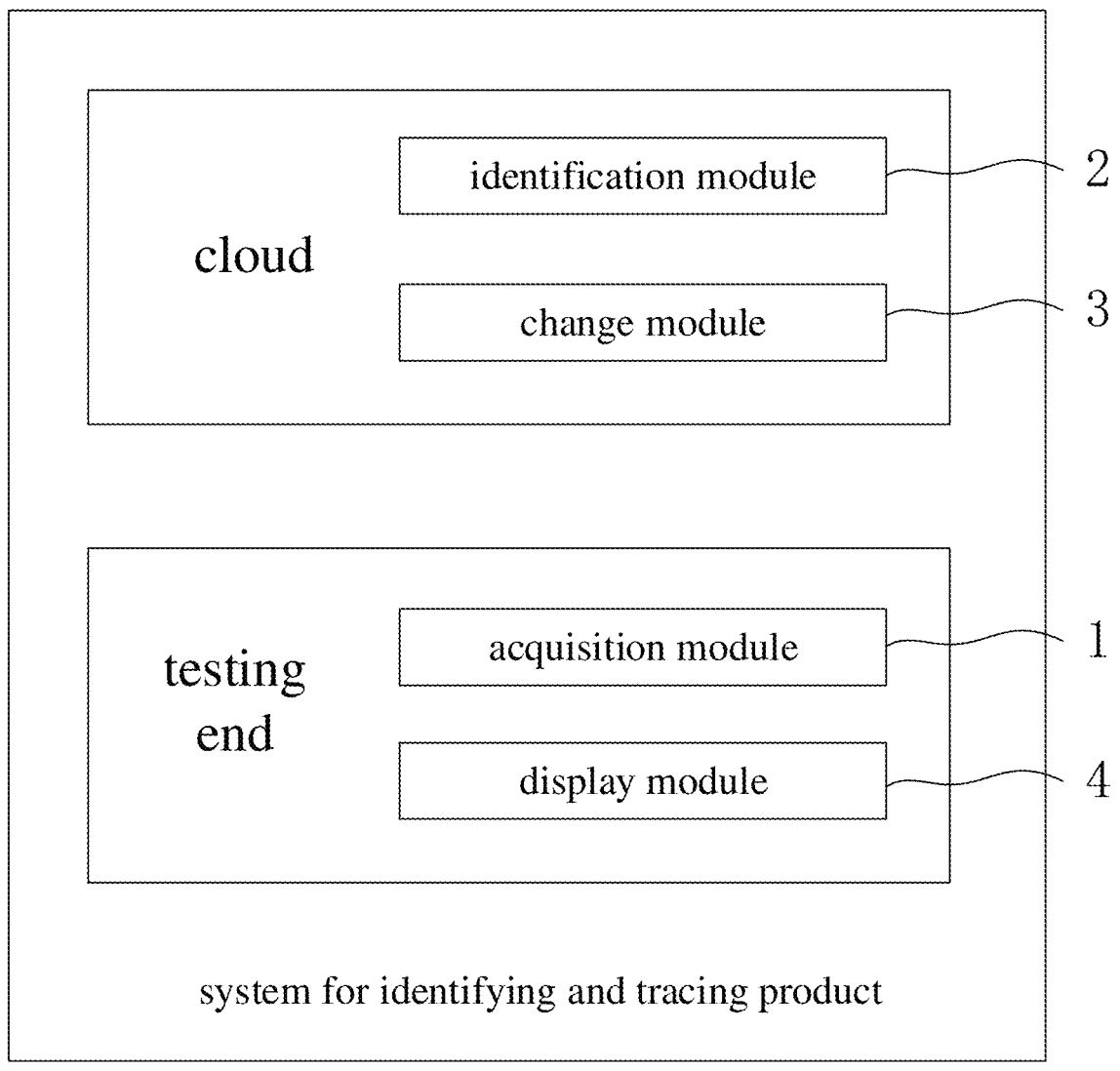
FIG. 7 is a schematic structure diagram of a system for identifying and tracing a product according to one of embodiments of the present application.

An embodiment of the present application further provides a system for identifying and tracing a product. The system for identifying and tracing the product corresponds to the method for identifying and tracing the product in the embodiment. With reference to FIG. 7, the system for identifying and tracing the product includes a testing end and a cloud; the testing end includes an acquisition module 1 and a display module 4; and the cloud includes an identification module 2 and a change module 3. Each functional module is described in detail as follows:

the acquisition module 1 is configured to acquire, by the testing end, source code information of a to-be-tested end, and identify an unique identification code according to a preset identification rule, the to-be-tested end being located on an openable part of the product;

the identification module 2 is configured to send the unique identification code to the cloud by the testing end, and identify the unique identification code by the cloud according to a preset comparison rule;

the change module 3 is configured to, when it is identified by the cloud that the product is a certified product, change the unique identification code according to a preset change rule to generate a certified product result data packet, and send the certified product result data packet to the testing end; and the display module 4 is configured to receive and display the certified product result data packet.

The testing end of the system can acquire the source code information of the to-be-tested end by means of the acquisition module 1, and identify the unique identification code according to the preset identification rule, the to-be-tested end being located on the openable part of the product; then, the testing end sends the unique identification code to the cloud, and the cloud identifies the unique identification code by means of the identification module 2 according to a preset comparison rule; when it is identified by the cloud that the product is the certified product, the cloud changes the unique identification code by means of the change module 3 according to the preset change rule to generate the certified product result data packet, and sends the certified product result data packet to the testing end; and finally, the testing end receives the certified product result data packet, and displays the certified product result data packet by means of the display module 4.

Specific limitations on the system for identifying and tracing the product can refer to the limitations on the method for identifying and tracing the product in the context so as not to be repeated herein. The modules of the above-mentioned system for identifying and tracing the product can be completely or partially implemented by means of software, hardware and a combination thereof. Each of the modules can be embedded in or independent of a processor of an electronic device in a form of hardware, or can be stored in a memory of the electronic device in a form of software, so that the processor is called to perform an operation corresponding to each of the above modules.

Figure 8:
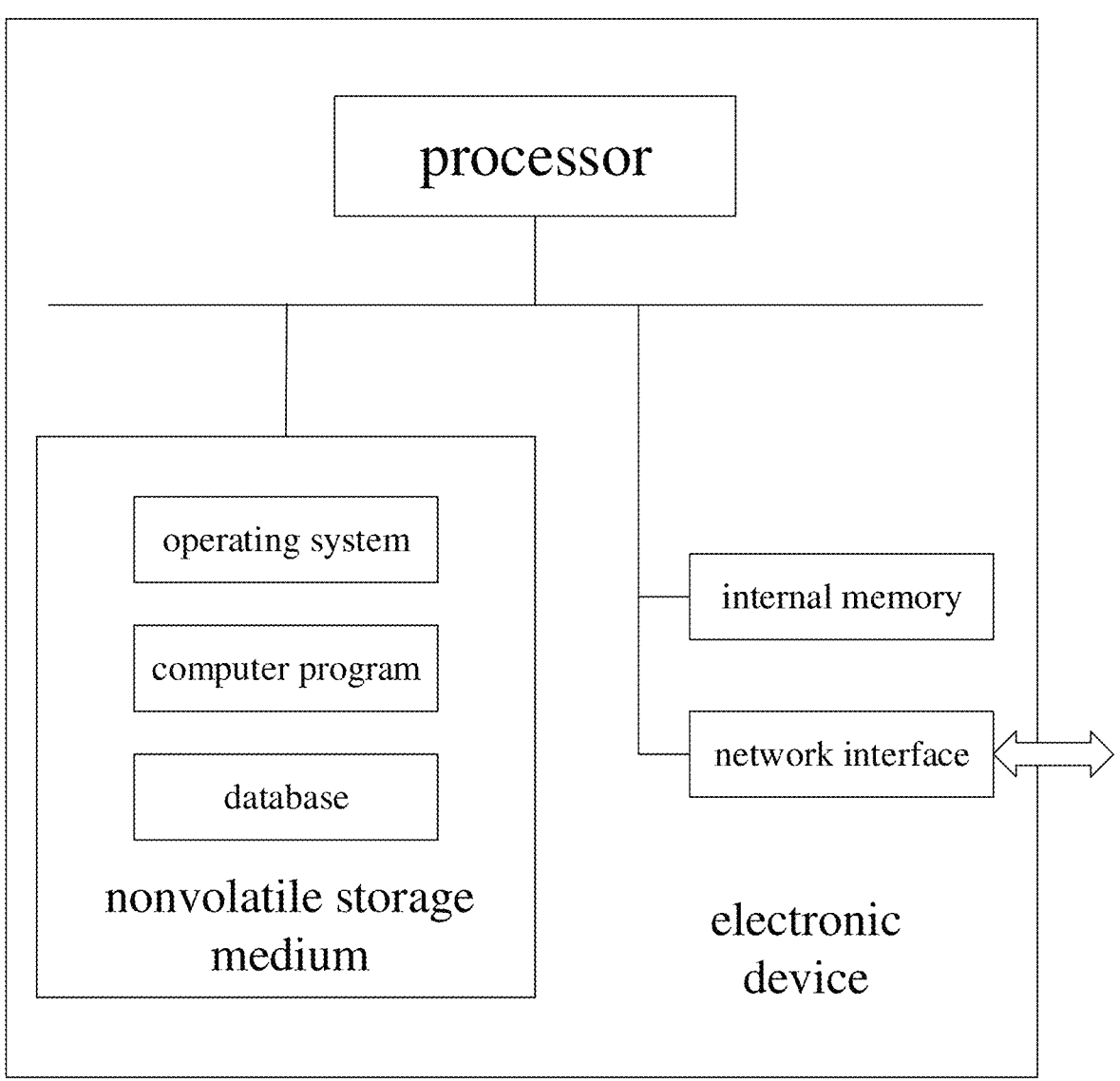
FIG. 8 is a principle block diagram of an electronic device in one of embodiments of the present application.

In the present embodiment, provided is an electronic device which is a computer. With reference to FIG. 8, the electronic device includes a processor, a memory, a network interface and a database which are connected by a system bus. The processor of the electronic device is configured to provide computation and control capacities. The memory of the electronic device includes a nonvolatile storage medium and an internal memory. The nonvolatile storage medium stores an operating system, a computer program, and a database. The internal memory provides an environment for the operation of the operating system and the computer program in the nonvolatile storage medium. The database of the electronic device is configured to store a tested data table. The network interface of the electronic device is configured to communicate with an external terminal by network connection. The computer program is configured to, when executed by the processor, implement the method for identifying and tracing the product.

In an embodiment, provided is an electronic device, including a memory, a processor, and a computer program stored on the memory and operable on the processor, the processor, when executing the computer program, implementing the steps in the foregoing method embodiment.

An embodiment of the present application further discloses a nonvolatile computer-readable storage medium, electronic device, having stored thereon a computer program which can be loaded and executed by a processor, the computer program, when executed by the processor, implementing the steps of any one of the above-mentioned method for identifying and tracing the product, and being capable of achieving the same effect.

The computer-readable storage medium includes various media, such as a U disk, a mobile hard disk, a Read-Only Memory (ROM), a Random Access Memory (RAM), a diskette or an optical disk, capable of storing program codes.

The above descriptions are all preferred embodiments of the present application, but are not intended to limit the protective scope of the present application Any features disclosed in the present description (including the abstract and the accompanying drawings) can be replaced with other equivalent features or substitutive features with similar objects unless specifically described. That is, each feature is only an example of a series of equivalent or similar features unless specifically described.

What is claimed is:

1. A method for identifying and tracing a product, comprising:

acquiring, by a testing end, source code information of a to-be-tested end, and identifying a unique identification code according to a preset identification rule, wherein the to-be-tested end is located on an openable part of the product;

sending the unique identification code to a cloud by the testing end, and identifying the unique identification code by the cloud according to a preset comparison rule;

when the product is identified by the cloud as a certified product, changing, by the cloud, the unique identification code according to a preset change rule to generate a certified product result data packet, and sending the certified product result data packet to the testing end; and receiving and displaying the certified product result data packet by the testing end;

wherein identifying the unique identification code by the cloud according to a preset comparison rule comprises:

generating an identification comparison code consistent with the unique identification code by a generation system of the cloud, the unique identification code comprising a subarea address storage number; after the cloud receives the unique identification code, identifying, by the cloud, the subarea address storage number, finding a corresponding subarea address in a storage list according to the subarea address storage number, and comparing the identification comparison code stored in subarea addresses with the unique identification code;

when a consistent identification comparison code exists, identifying the product as the certified product; and when no consistent identification comparison code exists, determining that the product is abnormal;

wherein the acquiring, by a testing end, source code information of a to-be-tested end, and identifying a unique identification code according to a preset identification rule comprises:

reading, by the testing end, the source code information of the to-be-tested end, and identifying the unique identification code according to a universal decoding rule, wherein after the source code information of the to-be-tested end is read, the to-be-tested end retains the source code information; and identifying the unique identification code by the cloud according to a preset comparison rule comprises: when the product is identified by the cloud as the certified product, adding an identifier to the identification comparison code to form an expired code, and storing the expired code in the cloud;

or, wherein the acquiring, by a testing end, source code information of a to-be-tested end, and identifying a unique identification code according to a preset identification rule comprises:

extracting, by the testing end, the source code information of the to-be-tested end, and identifying the unique identification code according to a specific decoding rule, wherein after the source code information of the to-be-tested end is successfully decoded, the to-be-tested end deletes the source code information; and identifying the unique identification code by the cloud according to a preset comparison rule comprises: when the product is identified by the cloud as the certified product, deleting the identification comparison code and the unique identification code;

wherein after the openable part of the product is opened in a preset opening way, and a destruction rate of the source code information reaches a preset range, the method further comprises:

after the to-be-tested end is destroyed, triggering a timer in the to-be-tested end for timing, and when the testing end tests the to-be-tested end, triggering the to-be-tested end to send a timing duration to the testing end;

when the testing end receives a standby identification code and the timing duration, sending the timing duration and the standby identification code to the cloud by the testing end; and when the cloud parses the standby identification code and determines that a secondary unique identification code is inconsistent with the unique identification code, determining opening time according to the timing duration and a current time, and sending the opening time and an abnormal state result data packet to the testing end; and wherein the method further comprises:

when the testing end receives the standby identification code, but does not receive the timing duration, and the testing end determines that the timing duration is a preset duration, sending the preset duration and the standby identification code to the cloud.

2. The method according to claim 1, wherein after the openable part of the product is opened in the preset opening way, the destruction rate of the source code information reaches the preset range, and the source code information is changed to secondary source code information; and the method further comprises:

acquiring, by the testing end, the secondary source code information, and identifying the standby identification code;

sending the standby identification code to the cloud by the testing end, and parsing the standby identification code by the cloud to obtain the secondary unique identification code and a unique identification code storage address;

obtaining the unique identification code by the cloud according to the unique identification code storage address, and comparing the secondary unique identification code with the unique identification code to determine whether the secondary unique identification code is consistent with the unique identification code;

when the secondary unique identification code is consistent with the unique identification code, generating the certified product result data packet; and when the secondary unique identification code is inconsistent with the unique identification code, generating the abnormal state result data packet.

3. A system for identifying and tracing a product, comprising: a testing end and a cloud;

the testing end comprises an acquisition module and a display module; and the cloud comprises an identification module and a change module;

wherein the acquisition module is configured to acquire source code information of a to-be-tested end, and identify a unique identification code according to a preset identification rule, wherein the to-be-tested end is located on an openable part of the product;

the identification module is configured to send the unique identification code to the cloud, and identify the unique identification code according to a preset comparison rule;

the change module is configured to, when the product is identified as a certified product, change the unique identification code according to a preset change rule to generate a certified product result data packet, and send the certified product result data packet to the testing end; and the display module is configured to receive and display the certified product result data packet by the testing end;

wherein identifying the unique identification code according to the preset comparison rule comprises:

generating an identification comparison code consistent with the unique identification code by a generation system of the cloud, the unique identification code comprising a subarea address storage number; after the cloud receives the unique identification code, identifying, by the cloud, the subarea address storage number, finding a corresponding subarea address in a storage list according to the subarea address storage number, and comparing the identification comparison code stored in subarea addresses with the unique identification code;

when a consistent identification comparison code exists, identifying the product as the certified product; and when no consistent identification comparison code exists, determining that the product is abnormal;

wherein one of:

acquiring the source code information of the to-be-tested end, and identifying the unique identification code according to the preset identification rule comprises:

reading, by the testing end, the source code information of the to-be-tested end, and identifying the unique identification code according to a universal decoding rule, wherein after the source code information of the to-be-tested end is read, the to-be-tested end retains the source code information; and identifying the unique identification code by the cloud according to the preset comparison rule comprises: when the product is identified by the cloud as the certified product, adding an identifier to the identification comparison code to form an expired code, and storing the expired code in the cloud;

or, acquiring the source code information of the to-be-tested end, and identifying the unique identification code according to the preset identification rule comprises:

extracting, by the testing end, the source code information of the to-be-tested end, and identifying the unique identification code according to a specific decoding rule, wherein after the source code information of the to-be-tested end is successfully decoded, the to-be-tested end deletes the source code information; and identifying the unique identification code by the cloud according to the preset comparison rule comprises: when the product is identified by the cloud as the certified product, deleting the identification comparison code and the unique identification code;

wherein after the openable part of the product is opened in a preset opening way, and a destruction rate of the source code information reaches a preset range, after the to-be-tested end is destroyed, a timer in the to-be-tested end is triggered for timing, and when the testing end tests the to-be-tested end, the to-be-tested end is triggered to send a timing duration to the testing end;

when the testing end receives a standby identification code and the timing duration, the testing end sends the timing duration and the standby identification code to the cloud;

when the cloud parses the standby identification code and determines that a secondary unique identification code is inconsistent with the unique identification code, the cloud determines opening time according to the timing duration and a current time, and sends the opening time and an abnormal state result data packet to the testing end; and when the testing end receives the standby identification code, but does not receive the timing duration, and the testing end determines that the timing duration is a preset duration, the testing end sends the preset duration and the standby identification code to the cloud.

4. An electronic device, comprising: a memory and a processor, wherein the memory stores a computer program, the processor is configured to execute the computer program stored on the memory to implement the method for identifying and tracing a product according to claim 1.

5. A nonvolatile computer-readable storage medium with a computer program stored thereon, wherein the computer program is configured to be executed by a processor to implement the method for identifying and tracing a product according to claim 1.

\* \* \* \* \*